March 3, 1942.  C. NIEMANN  2,275,308

CONTROL APPARATUS FOR ALTERNATING CURRENT DEVICES

Filed Jan. 19, 1939

Inventor:
Carl Niemann
By: Richardson and Auer
Attys.

Patented Mar. 3, 1942

2,275,308

UNITED STATES PATENT OFFICE 2,275,308

CONTROL APPARATUS FOR ALTERNATING CURRENT DEVICES

Carl Niemann, Erlangen, Germany, assignor to the firm Siemens-Reiniger-Werke Aktiengesellschaft, Berlin, Germany Application January 19, 1939, Serial No. 251,732
In Germany February 10, 1938

8 Claims. (Cl. 171—119)

The present invention relates in general to control apparatus for alternating current devices, and more in particular to such control arrangements as employ grid controlled space discharge tubes. The invention is well adapted to the control of Roentgen tubes, although it may be used for the control of motors or other devices operated on alternating current.

It is known to control alternating current devices, supplied over single or multi-phase alternating current circuits, by means of grid controlled discharge tubes, which may be high vacuum tubes, gas filled tubes, or metal vapor filled tubes. In order to accomplish this purpose, it has been proposed to use two control tubes oppositely connected in parallel in the alternating current circuit of the device to be controlled. With such an arrangement, however, difficulties are encountered because the grids of the two discharge tubes are not at the same potential.

The purpose of the present invention is to effect the control of an alternating current circuit by means of a single grid controlled discharge tube and thereby obviate the above noted drawback. In accordance with the invention, the single or multi-phase alternating current is rectified at a suitable point of the circuit by means of a suitable rectifying scheme, and is conducted through a grid controlled discharge tube which serves for the desired control.

Figure 1:
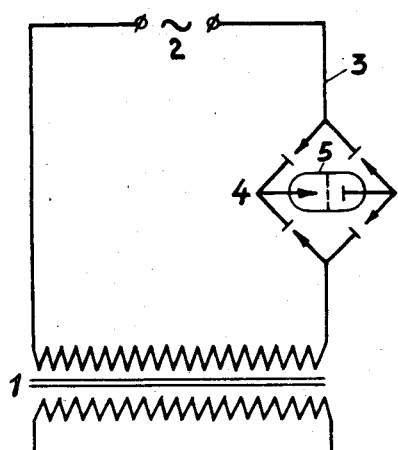
Figure 2:
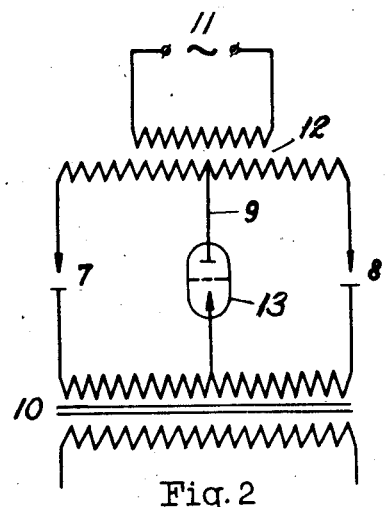
Figure 3:
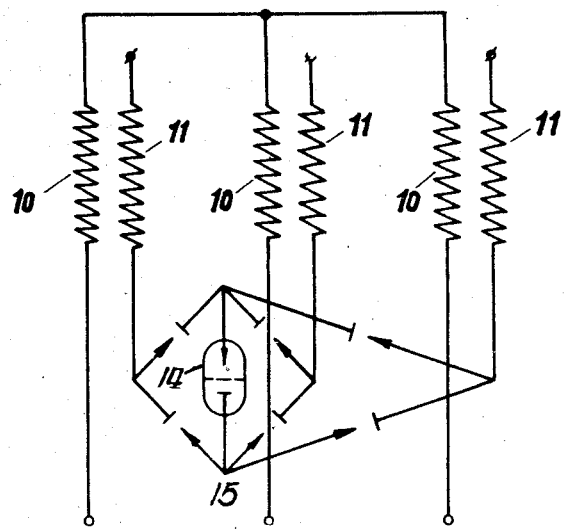

Three embodiments of the invention are shown in the circuit diagrams, Figs. 1, 2, and 3.

In the embodiment according to Fig. 1, an alternating current device 1, for example, the heating transformer of a Roentgen tube, is supplied from the alternating current source 2. In the conductor 3 leading to the device 1 using the alternating current there is arranged a rectifying device 4 consisting of four valves in a so-called Graetz circuit hookup. The rectified current flows through a grid controlled discharge tube 5. It is thus possible to control the alternating current circuit with a single grid controlled discharge tube 5 in any desired or suitable manner, as for example, by starting or stopping the current flow, or (if a high vacuum discharge tube is used) by regulating the current to any desired value.

In the arrangement according to Fig. 2, the alternating current device or transformer 10 is supplied from the source 11 by means of the transformer 12. In order to rectify the alternating current for the grid controlled discharge tube 13 in the middle bridge 9, a so-called Wehnelt circuit scheme is used having two valves 7 and 8. With this arrangement only two valves are required instead of four.

The embodiment shown in Fig. 3 is an arrangement suitable for controlling an electromotor which is supplied with polyphase alternating current. The rectification of the current for the grid controlled discharge tube 14 takes place similarly as in the embodiment shown in Fig. 1, by means of an arrangement 15 using a Graetz circuit scheme for polyphase current with six valves. The grid controlled discharge tube 14 again serves as a control device, and functions to control the current in all three phases.

In case gas-filled or metal vapor filled tubes are used for the control, it is desirable to employ a rectifying circuit which delivers a pulsating unidirectional voltage, since the extinguishing of a gas or metal vapor filled discharge tube is possible only if the anode voltage falls to zero. With the arrangements shown the required conditions obtain, so that no additional means are required for extinguishing the discharge tube when the current is to be shut off.

I claim:

1. In a control system, an alternating current circuit, a space discharge tube included in said circuit, and means including rectifiers associated with said tube for causing successive half-waves of the current to always flow in the same direction in that portion of the circuit which includes said tube while flowing alternately in opposite directions in the remainder of the circuit.

2. In a control system, an alternating current device, a source of alternating current, circuit means for supplying alternating current from said source to said device including a conductor which carries current regardless of the polarity of said source, rectifying means for causing the current carried by said conductor to flow always in the same direction, and a grid controlled space discharge device which carries both successive half-waves of said alternating current included in said conductor.

3. In a control system, means including two transformers for connecting a source of alternating current to an alternating current device, conductors connecting the terminals of the secondary winding of the first transformer, respectively, to the terminals of the primary winding of the second transformer, a rectifier included in each said conductor, a third conductor extending from the mid-point of said secondary winding to the mid-point of said primary winding, and a grid controlled space discharge tube included in said third conductor, the said rectifiers and said discharge device being so connected in their respective conductors that said discharge device carries a current in series with said rectifiers alternately.

4. In a control system, a three-phase supply circuit for an alternating current device, a conductor common to all three phases, means for causing said conductor to carry current always in the same direction, and a grid controlled space discharge device included in said conductor.

5. In a control system, an alternating current circuit, a grid controlled space discharge tube, two rectifiers arranged to complete the said circuit through said tube when the current flows in the circuit in one direction, and two other rectifiers arranged to complete the said circuit through said tube when the current flows in the circuit in the opposite direction, the direction of current flow through said tube being the same in each case.

6. In a control system, an alternating current circuit, a grid controlled space discharge tube connected in said circuit, said tube conducting current only in one direction, the said current changing its direction of flow in all portions of said circuit except a section which includes said tube, and means associated with said section for effectively maintaining potential conditions therein with respect to said tube, said tube carrying all the current regardless of its direction of flow in the main circuit.

7. In a control system, a circuit over which power is supplied to a load, switching means in said circuit comprising a grid controlled space discharge device, and means for supplying alternating current over said circuit to the load notwithstanding that said discharge device can pass current in only one direction, said last means including rectifiers for causing both half waves of said alternating current to pass through said discharge device.

8. In a control system, an alternating current device, means for supplying alternating current to said device including circuit sections carrying said alternating current, a circuit section connected in series with the other sections, rectifying means for causing both the negative and positive half-waves of the alternating current which flows in said first mentioned sections to flow in said last mentioned section as direct current, and a grid controlled space discharge device included in said last mentioned section.

CARL NIEMANN.